(12) United States Patent
Barjonas et al.

(10) Patent No.: US 10,516,705 B2
(45) Date of Patent: *Dec. 24, 2019

(54) DEVICE CONTROL FOR A COMMUNICATION SESSION

(71) Applicant: Microsoft Technology Licensing, LLC, Redmond, WA (US)

(72) Inventors: Hamish Rory Barjonas, Bellevue, WA (US); Simon Lucas, Redhill (GB); Carl David Blundell, Cardiff (GB); Mark Christopher Wass, Chelmsford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/103,890

(22) Filed: Aug. 14, 2018

(65) Prior Publication Data

US 2018/0359289 A1 Dec. 13, 2018

Related U.S. Application Data

(63) Continuation of application No. 14/684,068, filed on Apr. 10, 2015, now Pat. No. 10,091,252.

(51) Int. Cl.
*G06F 15/16* (2006.01)
*H04L 29/06* (2006.01)
*H04L 29/08* (2006.01)

(52) U.S. Cl.
CPC .......... *H04L 65/1069* (2013.01); *H04L 63/08* (2013.01); *H04L 65/102* (2013.01); *H04L 65/1089* (2013.01); *H04L 65/4076* (2013.01); *H04L 67/148* (2013.01)

(58) Field of Classification Search
CPC ..... H04L 63/08; H04L 63/148; H04L 65/102; H04L 65/1069; H04L 65/1089
See application file for complete search history.

(56) References Cited

U.S. PATENT DOCUMENTS 10,091,252 B2 * 10/2018 Barjonas ............. H04L 65/1089
2005/0249196 A1 * 11/2005 Ansari ................ H04L 12/2803
370/352

FOREIGN PATENT DOCUMENTS

CN 1611059 A 4/2005

OTHER PUBLICATIONS

"First Office Action and Search Report Issued in Chinese Patent Application No. 201680021048.8", dated Oct. 24, 2019, 21 Pages.

* cited by examiner

*Primary Examiner* — Yves Dalencourt
(74) *Attorney, Agent, or Firm* — Schwegman Lundberg & Woessner, P.A.

(57) ABSTRACT

Techniques for device control for a communication session are described. According to various embodiments, a claim process is performed that establishes a control relationship between a controller and a remote device. The controller causes the remote device to initiate a communication session with a different device using a designated identity. The device outputs a media stream that includes session media exchanged as part of the communication session.

20 Claims, 8 Drawing Sheets

DEVICE CONTROL FOR A COMMUNICATION SESSION

RELATED APPLICATION

This application is a continuation of and claims priority to U.S. patent application Ser. No. 14/684,068, filed on 10 Apr. 2015 and titled "Endpoint Control for a Communication Session," the entire contents of which are hereby incorporated by reference in their entirety herein.

BACKGROUND

Modern communication systems have an array of capabilities, including integration of various communication modalities with different services. For example, instant messaging, voice/video communications, data/application sharing, white-boarding, and other forms of communication may be combined with presence and availability information for subscribers. Such systems may provide subscribers with the enhanced capabilities such as providing instructions to callers for various status categories, alternate contacts, calendar information, and comparable features. Furthermore, collaboration systems enabling users to share and collaborate in creating and modifying various types of documents and content may be integrated with multimodal communication systems providing different kinds of communication and collaboration capabilities. Thus, users may engage in real-time communication sessions with one another to exchange various types of communication media.

Such communication scenarios may not only be leveraged for inter-personal communication, but may also serve as content feeds for media broadcast. For instance, a communication session among users may be utilized as content for a broadcast media event, such as a network television event, a webcast, a multicast, a network-enabled conferencing event, and so forth. Connecting and managing communication sessions for media feeds, however, presents a number of implementation and logistic challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for device control for a communication session are described. According to various embodiments, a claim process is performed that establishes a control relationship between a controller and a remote device. The controller causes the remote device to initiate a communication session with a different device using a designated identity. The device outputs a media stream that includes session media exchanged as part of the communication session. Generally, the media stream may be utilized for various purposes, such as for broadcast television, Internet broadcast, recorded media, and so forth.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for device control for a communication session are described. In at least some implementations, a communication session refers to a real-time exchange of communication media between different communication endpoints. Examples of a communication session include a Voice over Internet Protocol (VoIP) call, a video call, text messaging, a file transfer, content sharing, and/or combinations thereof. In at least some embodiments, a communication session represents a Unified Communication and Collaboration (UC&C) session.

According to various implementations, a claim process is performed that establishes a control relationship between a controller and an endpoint device. The controller then causes the endpoint device to initiate a communication session with a different endpoint device using an identity of the controller. The endpoint device outputs a media stream that includes session media exchanged as part of the communication session. Generally, the media stream may be utilized for various purposes, such as for broadcast television, Internet broadcast, recorded media, and so forth. Thus, techniques described herein enable remote initiation and control of communication sessions such that media streams can be generated on remote devices and utilized to generate consumable media content.

In the following discussion, an example environment is first described that is operable to employ techniques described herein. Next, a section entitled "Example Implementation Scenarios" describes some example implementation scenarios in accordance with one or more embodiments. Following this, a section entitled "Example Procedures" describes some example procedures in accordance with one or more embodiments. Finally, a section entitled "Example System and Device" describes an example system and device that are operable to employ techniques discussed herein in accordance with one or more embodiments.

Having presented an overview of example implementations in accordance with one or more embodiments, consider now an example environment in which example implementations may by employed.

Example Environment

Figure 1:
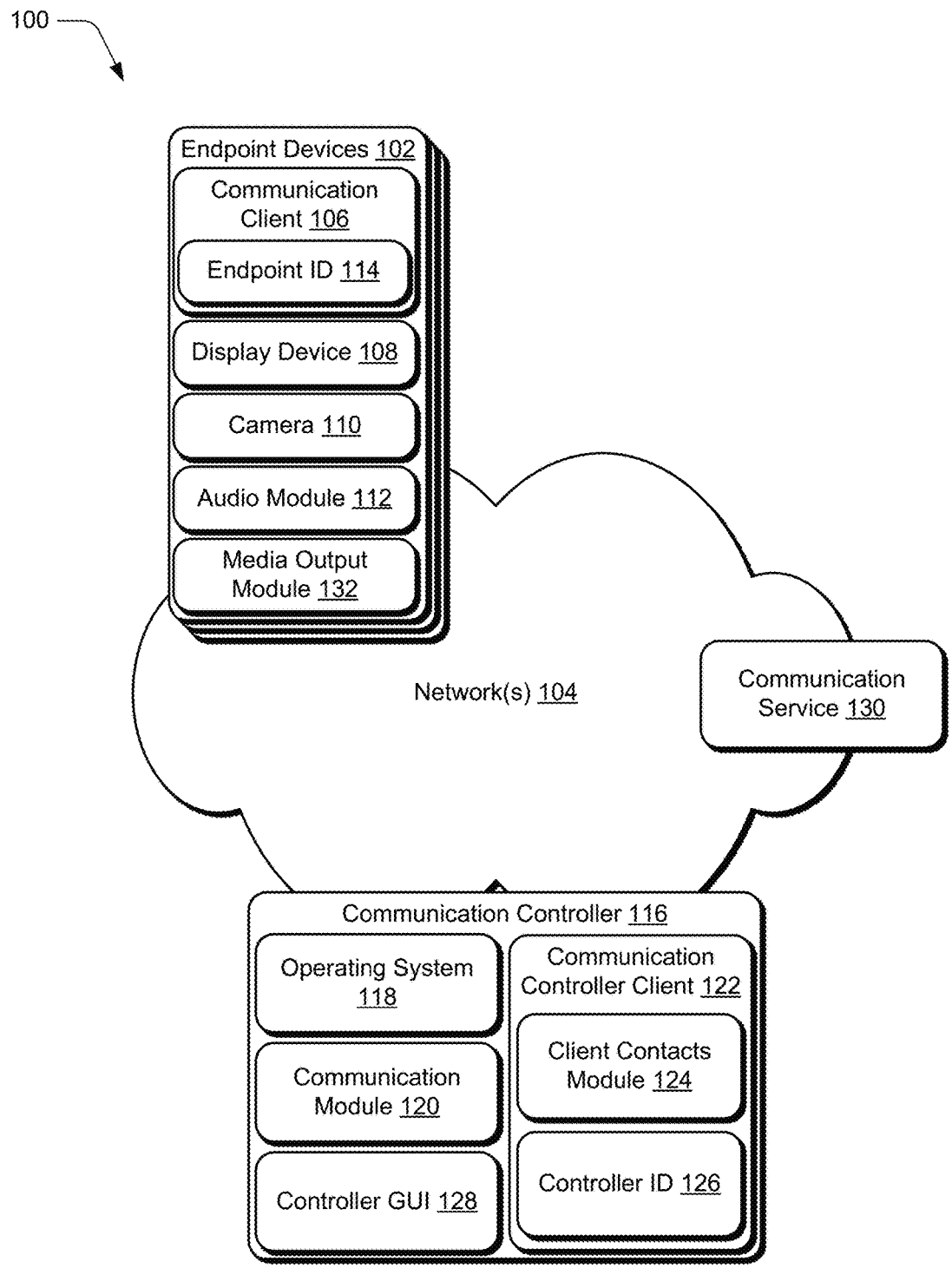
FIG. 1 is an illustration of an environment in an example implementation that is operable to employ techniques discussed herein.

FIG. 1 is an illustration of an environment 100 in an example implementation that is operable to employ techniques for device control for a communication session described herein. Generally, the environment 100 includes various devices, services, and networks that enable communication via a variety of different modalities. For instance, the environment 100 includes endpoint devices 102 connected to a network 104. The endpoint devices 102 represent a variety of different types and/or instances of devices, such as traditional computers (e.g., a desktop personal computer, laptop computer, and so on), smartphones, wearable devices, netbooks, game consoles, entertainment appliances, handheld devices, (e.g., a tablet), and so forth.

The network 104 is representative of a network that provides the endpoint devices 102 with connectivity to various networks and/or services, such as the Internet. The network 104 may provide the endpoint devices 102 with connectivity via a variety of different connectivity technologies, such as broadband cable, digital subscriber line (DSL), wireless cellular, wireless data connectivity (e.g., WiFi™), T-carrier (e.g., T1), Ethernet, and so forth. In at least some implementations, the network 104 represents different interconnected wired and wireless networks.

The endpoint devices 102 include a variety of different functionalities that enable various activities and tasks to be performed. For instance, the endpoint devices 102 each include respective instances of a communication client 106, a display device 108, a camera 110, and an audio module 112. The communication client 106 is representative of functionality to enable different forms of communication via the endpoint devices 102. Examples of the communication client 106 include a voice communication application (e.g., a VoIP client), a video communication application, a messaging application, a content sharing application, a unified communication & collaboration (UC&C) application, and combinations thereof. The communication client 106, for instance, enables different communication modalities to be combined to provide diverse communication scenarios. According to various implementations, the endpoint devices 102 may engage in communication sessions with one another via interaction between their respective instances of the communication client 106.

The communication client 106 includes an endpoint identity (ID) 114, which is representative of an identifier that distinguishes the endpoint devices 102 from other entities and/or devices. For instance, the individual endpoint devices 102 leverage their respective endpoint IDs 114 to identify themselves to other devices (e.g., other endpoint devices 102) and to engage in communications with other devices. In at least some implementations, the endpoint ID 114 for each of the endpoint devices 102 is associated with various identity-related information for its respective endpoint device 102, such as a username, a user type, authentication factor(s), user permissions, privacy settings, and so forth.

The display device 108 generally represents functionality for visual output for the endpoint device 102. Additionally, the display device 108 represents functionality for receiving various types of input, such as touch input, pen input, and so forth.

The camera 110 is representative of functionality to capture and record visual images, such as still images, video, and so on. The camera 110 includes various image capture components, such as apertures, lenses, mirrors, prisms, electronic image sensors, and so on. Alternatively or additionally, the camera 110 includes functionality for capturing video data generated at other devices and/or locations. For instance, the camera 110 includes a video capture card, such as a serial digital interface (SDI) video capture card.

The audio module 112 represents functionality for audio capture, processing, and output for the endpoint devices 102, such as hardware and logic to receive, process, and output audible sound for the endpoint devices 102. Examples of the audio module 112 include a microphone, a speaker, sound processing logic, and so forth.

The environment 100 further includes a communication controller 116, which is representative of functionality to initiate and control communication among the endpoint devices 102. The communication controller 116 includes a variety of different functionalities that enable various activities and tasks to be performed. For instance, the communication controller 116 includes an operating system 118, a communication module 120, and a communication controller client ("controller client") 122.

Generally, the operating system 118 is representative of functionality for abstracting various system components of the communication controller 116, such as hardware, kernel-level modules and services, and so forth.

The communication module 120 is representative of functionality for enabling the communication controller 116 to communicate data over wired and/or wireless connections. For instance, the communication module 120 represents hardware and logic for data communication via a variety of different wired and/or wireless technologies and protocols, such as leveraging the network 104.

The controller client 122 is representative of functionality for performing various aspects of techniques for device control for a communication session described herein. For instance, the controller client 122 is operable to cause communication sessions to be initiated among different endpoint devices 102, and for media exchanged during a communication session to be utilized for a media feed.

The controller client 122 includes a client contacts module 124, output module 132 which is representative of functionality to create and manage a contacts list for the controller client 122. For instance, the client contacts module 124 tracks a variety of different contact information for different contacts of the controller client 122. Examples of such contact information include personal names, usernames, phone numbers, email addresses, Internet Protocol (IP) addresses, physical addresses, avatars, and so forth. The client contacts module 124, for instance, includes contact entries for the endpoint devices 102. Thus, the client contacts module 124 may track a variety of different contact-specific information for different contacts.

The controller client 122 further includes a controller identity (ID) 126, which is representative of an identifier that distinguishes the controller client 122 for other entities and/or devices. For instance, the controller client 122 and the endpoints 102 identify themselves to other devices (e.g., other endpoint devices 102) and engage in communications with other devices utilizing the controller ID 126. In at least some implementations, the controller ID 126 is associated with various identity-related information, such as a username, a user type, authentication factor(s), user permissions, privacy settings, and so forth. Further, the controller ID 126 has a set of contacts that are managed by the client contacts module 124.

The communication controller 116 further includes a controller graphical user interface (GUI) 128 which is representative of functionality to generate and present a GUI that is configured to receive user input and to display status information pertaining to techniques for device control for a communication session discussed herein. An example instance of the controller GUI 128 is discussed below with reference to FIG. 4.

According to various implementations, the communication client 106 and the controller client 122 are configured to interface via a communication service 130. Generally, the communication service 130 is representative of a service to perform various tasks for management of communication between the endpoint devices 102. The communication service 130, for instance, can manage initiation, moderation, and termination of communication sessions between the communication clients 106 for the different endpoint devices 102.

The communication service 130 maintains a presence across many different networks and can be implemented according to a variety of different architectures, such as a cloud-based service, a distributed service, a web-based service, and so forth. Examples of the communication service 130 include a VoIP service, an online conferencing service, a UC&C service, and so forth.

Further to techniques for device control for a communication session discussed herein, the endpoint devices 102 include a media output module 132, which is representative of functionality to provide media output streams from communication sessions initiated and/or managed by the communication controller 116. For instance, audio and video media exchanged as part of a communication session between different endpoint devices 102 can be output via the media output module 132 to a consuming entity. Examples of such a consuming entity include a television control room (a "gallery), a media production facility, a media recording functionality, and so forth. In at least some implementations, output from the media output module 132 simulates professional video camera output such that the output is usable to generate professional broadcast and recorded media content.

Having described an example environment in which the techniques described herein may operate, consider now a discussion of some example implementation scenarios for device control for a communication session in accordance with one or more embodiments.

Example Implementation Scenario

The following section describes some example implementation scenarios for device control for a communication session in accordance with one or more implementations. The implementation scenarios may be implemented in the environment 100 discussed above, and/or any other suitable environment.

Figure 2:
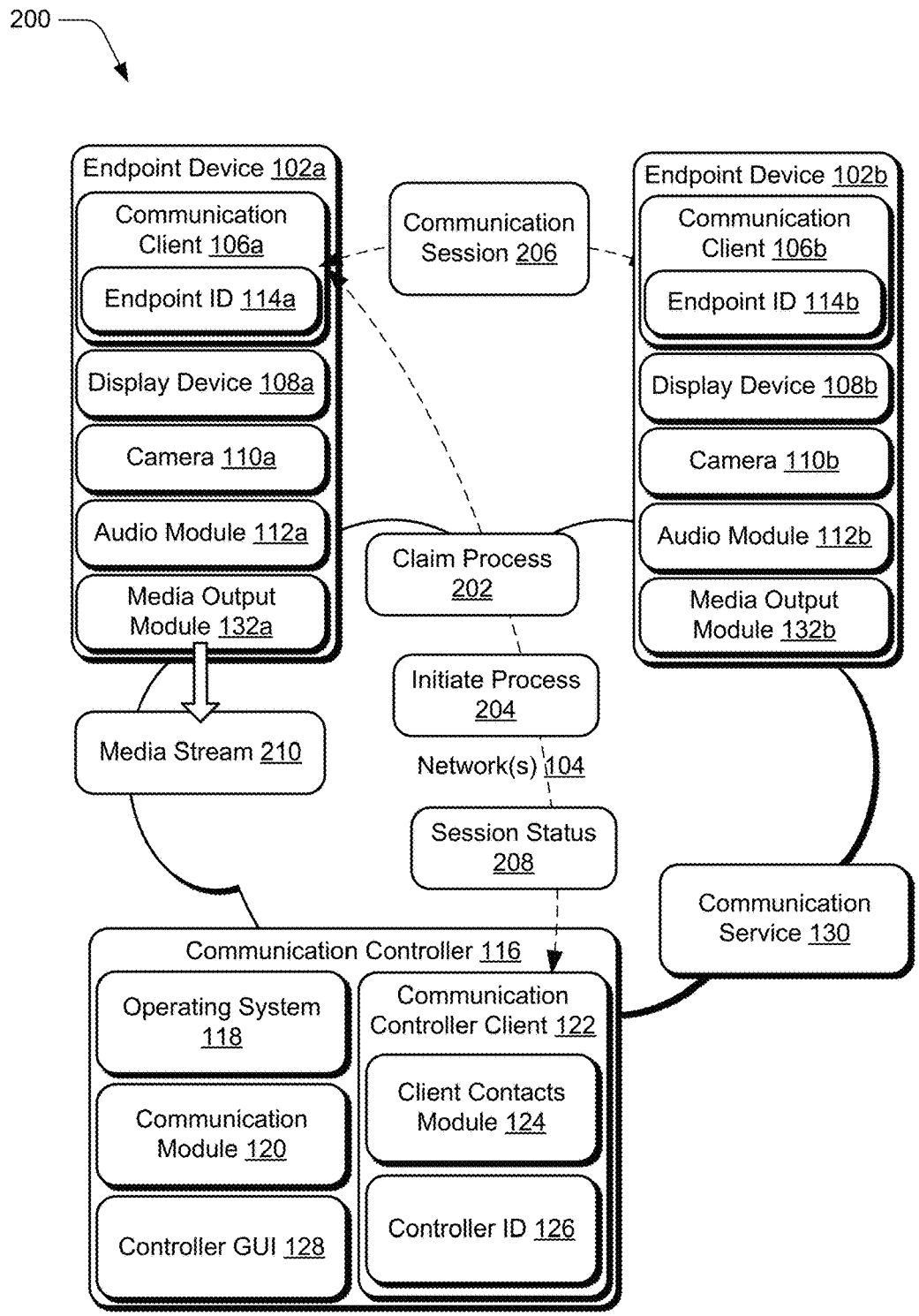
FIG. 2 depicts an example implementation scenario for initiating a remote call in accordance with one or more embodiments.

FIG. 2 depicts an example implementation scenario 200 for initiating a remote call in accordance with one or more implementations. The scenario 200 includes various entities and components introduced above with reference to the environment 100.

In the scenario 200, the communication controller 116 engages in a claim process 202 with an endpoint device 102a. Generally, the claim process 202 represents a handshake procedure that enables the communication controller 116 to control the endpoint device 102a to initiate communication sessions on behalf of the communication controller 116.

The claim process 202 causes a communication client 106a of the endpoint device 102a to be logged in to the communication service 130 using the controller ID 126 of the controller client 122. For instance, if the communication client 106a is logged in to the communication service 130 as an endpoint ID 114a, the claim process 202 causes the communication client 106a to log out from the endpoint ID 114a and to log in to the communication service 130 as the controller ID 126.

Thus, in at least some implementations, the claim process 202 involves communicating authentication information to the endpoint device 102a that enables the communication client 106a to authenticate with the communication service 130 using the controller ID 126. Once logged in using the controller ID 126, the communication client 106a can initiate a communication session via the communication service 130 with a different endpoint device 102 such that the communication session appears to be from the controller client 122. Further, a contacts list for the controller ID 126 is shared to the communication client 106a such that the communication client 106a can initiate communication events with the contacts.

The claim process 202 further establishes a control channel between the communication controller 116 and the endpoint device 102a that enables the controller client 122 to communicate instructions to the communication client 106a, and for the communication client 106a to return various events and media to the controller client 122.

Continuing with the scenario 200, the controller client 122 triggers an initiate process 204 with the communication client 106a to cause the communication client 106a to initiate a communication session 206 with a communication client 106b of an endpoint device 102b. The initiate process 204, for example, includes contact information for the communication client 106b and instructions to the communication client 106a to initiate the communication session 206 with the communication client 106b. The communication client 106b, for instance, represents a contact entry in the client contacts module 124, e.g., a contact of the controller ID 126.

The initiate process 204 includes various parameters for the communication session 206, such as a call time at which the communication session is to be initiated, media type(s) to be exchanged during the communication session, media type(s) to be provided from the endpoint device 102a during the communication session 206, and forth.

Thus, in response to the initiate process 204, the communication client 106a initiates the communication session 206 with the communication client 106b of the endpoint device 102b. The communication session 206, for example, is initiated and managed via interaction with the communication service 130. Generally, the communication session 206 represents an exchange of various media between the communication clients 106a, 106b, such as voice data, video data, content (e.g., files), messaging, and so forth. Since the communication client 106a is logged in as the controller ID 126, the communication session 206 appears to the communication client 106b to be initiated by the controller client 122. Further, permissions and privacy settings for the controller ID 126 are enforced for the communication session 206.

Further to the scenario 200, the endpoint device 102a returns session status 208 to the controller client 122. Generally, the session status 208 includes various status information or the communication session 206, such as session quality information, network performance attributes, identity information for entities involved in the communication session 206, types of media being exchanged during the communication session, and so forth. In at least some implementations, the session status 208 includes at least some of the media exchanged between the communication clients 106a, 106b during the communication session 206, such as to provide the communication controller 116 with an overview of the communication session 206.

Continuing with the scenario 200, the endpoint device 102a communicates a media stream 210 to an external entity via a media output module 132a. The media stream 210, for instance, includes some or all of the media exchanged as part of the communication session 206. In at least some implementations, the endpoint device 102a processes the session media before it is streamed in the media stream 210, such as to put the session media in a suitable form for broadcast content. For example, the media stream 210 provides the session media in a form that may be inserted into broadcast media, such as for live and/or recorded content to be broadcast over a network. In at least some implementations, the endpoint device 102b may similarly output a different respective media stream that includes session media from the communication session 206.

According to one or more implementations, when the communication session 206 is terminated, the communication client 106a remains logged in to the controller ID 126 account such that the communication client 106a may initiate a subsequent communication session and/or answer a call request utilizing the controller ID 126.

Figure 3:
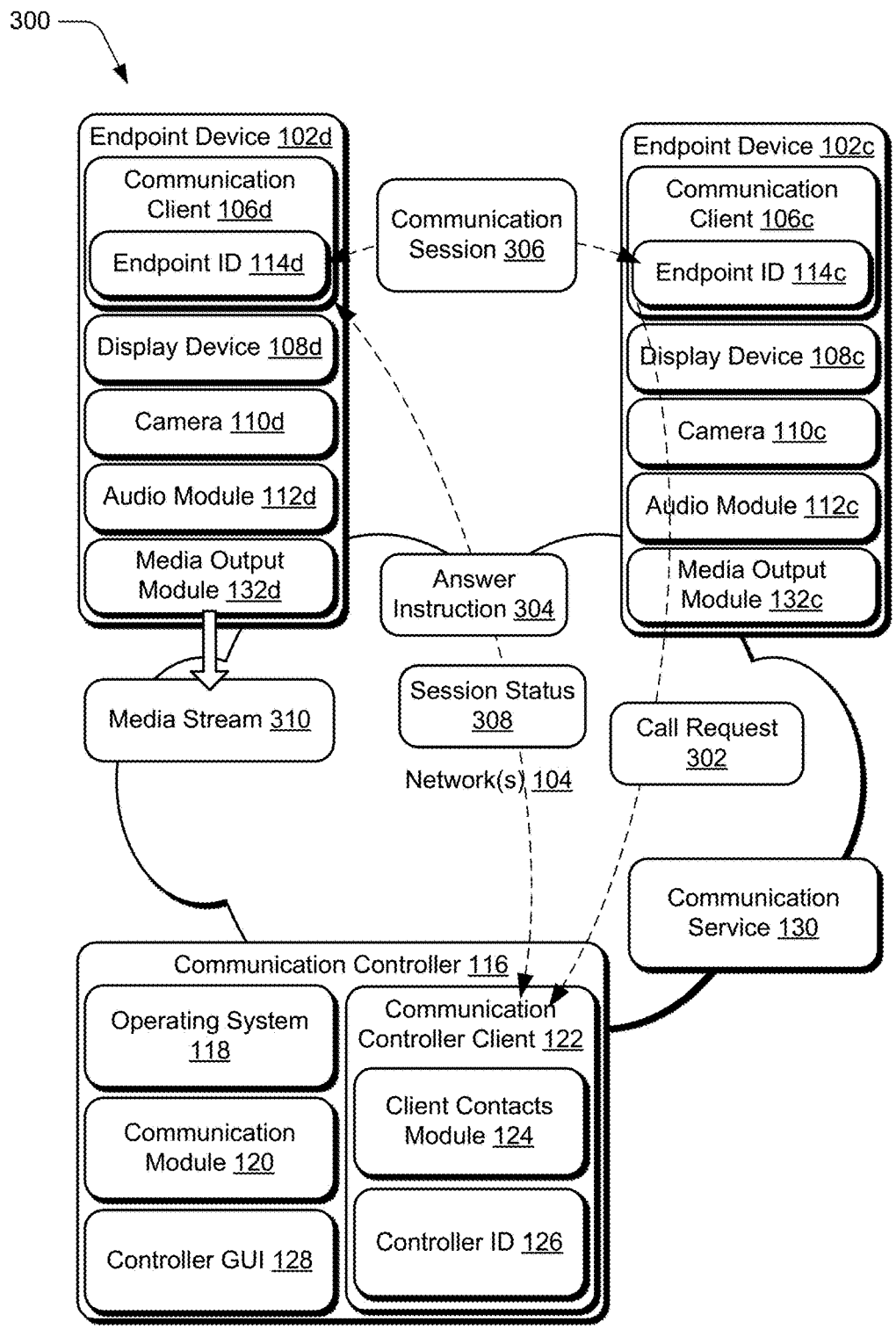
FIG. 3 depicts an example implementation scenario for initiating a remote call answer in accordance with one or more embodiments.

FIG. 3 depicts an example implementation scenario 300 for initiating a remote call answer in accordance with one or more implementations. The scenario 300 includes various entities and components introduced above with reference to the environment 100. In at least some implementations, the scenario 300 represents an extension and/or variation of the scenario 200, described above.

In the scenario 300, the controller client 122 receives a call request 302 from a communication client 106c of an endpoint device 102c. The call request 302, for instance, requests that the controller client 122 engage in a communication session with the communication client 106c. For example, the call request 208 is addressed to the controller ID 126.

In response to the call request 302, the controller client 122 selects an available endpoint device 102 to accept the call request 302. For instance, the controller client 122 searches the client contacts module 124 for an endpoint device with status information that indicates that the endpoint device is available to accept the call request. Accordingly, the controller client 122 determines that a communication client 106d of an endpoint device 102d is available to accept the call request.

Continuing with the scenario 300, the controller client 122 communicates an answer instruction 304 to the endpoint device 102d instructing the communication client 106d to answer the call request 302 on behalf of the controller client 122. The answer instruction 304, for instance, includes an endpoint ID 114c for the endpoint device 102c. In at least some implementations, the answer instruction 304 involves a claim process that causes the communication client 106d to log in to the communication service 130 using the controller ID 126. Example aspects of a claim process are described above.

Accordingly, and in response to the answer instruction 304, the communication client 106d answers the call request 302 and thus a communication session 306 is established between the endpoint devices 102c, 102d. The communication session 306, for instance, is initiated and managed via interaction with the communication service 130. According to one or more implementations, the communication client 106d has been claimed by the controller client 122, and thus the communication session 306 appears to the communication client 106c to be between the communication client 106c and the controller ID 126. In such implementations, privacy and permission settings for the controller ID 126 are enforced for the communication session 306.

Further to the scenario 300, the endpoint device 102d communicates session status 308 to the communication controller 116. Generally, the session status 308 includes status information for the communication session 306. Examples of different session status information are provided above.

Continuing with the scenario 300, the endpoint device 102d communicates a media stream 310 to an external entity. The media stream 310, for instance, includes some or all of the media exchanged as part of the communication session 306. In at least some implementations, the endpoint device 102d processes the session media before it is streamed in the media stream 310, such as to put the session media in a suitable form for broadcast content. For example, the media stream 310 provides the session media in a form that may be inserted into broadcast media, such as for live and/or recorded content to be broadcast over a network. In at least some implementations, the endpoint device 102c may similarly output a different respective media stream that includes session media from the communication session 206.

While the scenarios 200, 300 are depicted with reference to a communication session between two devices, it is to be appreciated that techniques for device control for a communication session discussed herein are scalable to enable a communication session to be initiated between more than two devices (e.g., a conference call), and to enable multiple different communication sessions to be initiated and managed concurrently. For instance, using the procedures described in the scenarios 200, 300, the controller client 122 can cause different communication clients 106 to initiate different communication sessions with other communication clients 106 such that the communication sessions are at least partially concurrent. Further, the controller client 122 can concurrently manage the different communication sessions, and the endpoint devices participating in the communication sessions can provide different discrete media streams for each of the communication sessions.

Figure 4:
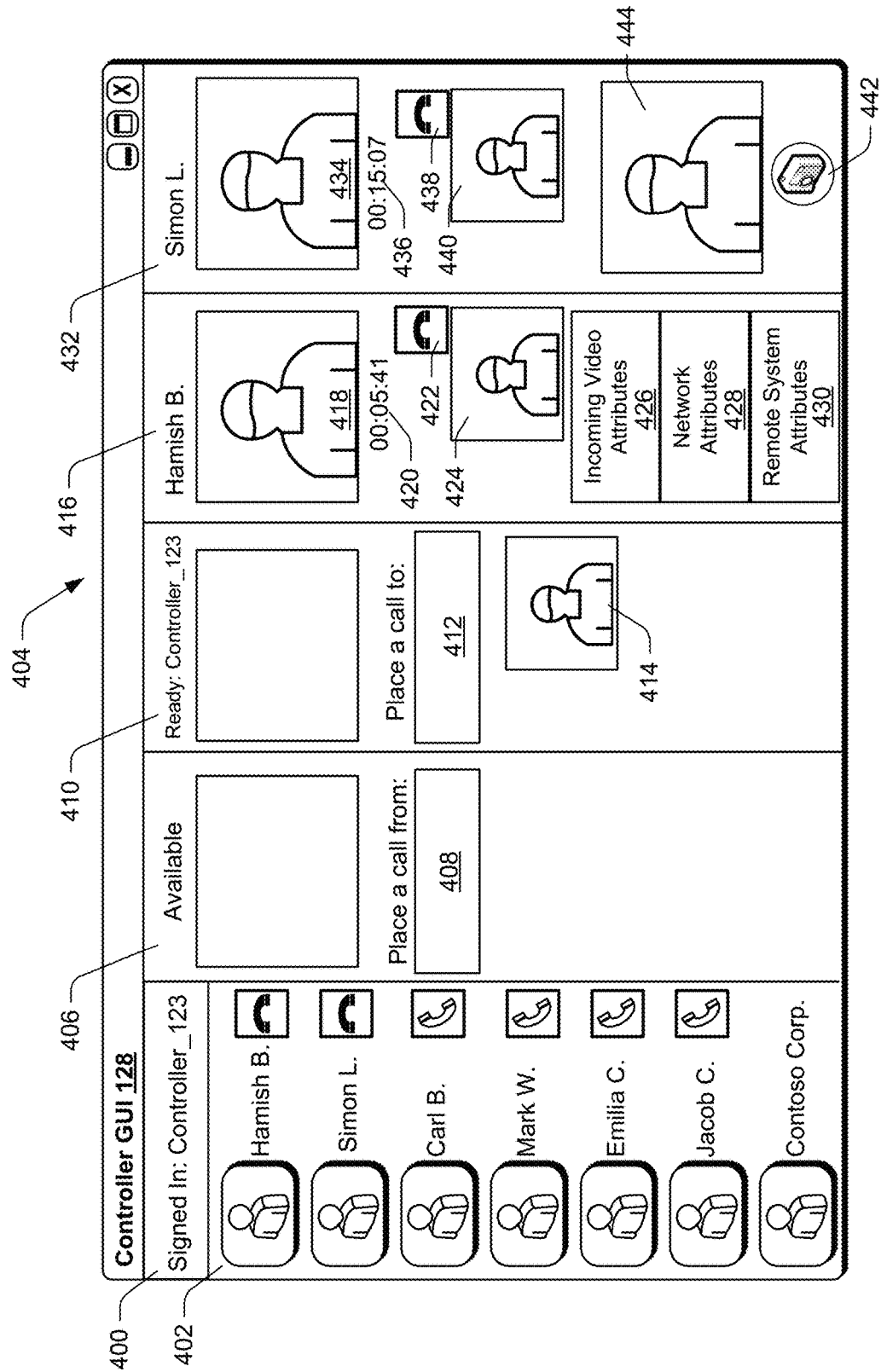
FIG. 4 depicts an example implementation of the controller graphical user interface in accordance with one or more embodiments.

FIG. 4 depicts an example implementation of the controller GUI 128 in accordance with one or more implementations. Generally, the controller GUI 128 enables a user to control the controller client 122 to perform various aspects of techniques for device control for a communication session discussed herein. For instance, various aspects of the scenarios 200, 300 can be initiated and controlled in response to user input to the controller GUI 128. Example visual and functional attributes of the controller GUI 128 are now explained.

The controller GUI 128 includes an identity field 400, a contacts field 402, and a call control region 404. The identity field 402 identifies a current identity under which the controller client 122 is signed in. The identity field 402, for instance, includes a username for the controller ID 126. The contacts field 402 includes identifiers and visual icons for different contacts for the controller client 122. For example, the contacts listed in the contacts field 402 represents contacts from the client contacts module 124, and represent contacts of the controller ID 126. The visual icons for the different contacts are selectable to initiate various actions, such as a claiming process, a call initiation process, and so forth. In at least some implementations, the contacts listed in the contacts field 402 represents users for respective instances of the endpoint devices 102.

The call control region 404 represents a portion of the controller GUI 128 that enables communication sessions to be initiated and displays status information for communication sessions. For instance, the call control region 404 includes several control panels that each configured to be leveraged to perform various actions for call initiation and control.

A control panel 406, for example, represents a control panel that is available to receive user input to initiate a claim process with an endpoint device 102. As illustrated, the control panel 406 includes an "Available" status identifier to indicate that the control panel 406 is not currently linked to a claimed device. Further, the control panel 406 includes a claim field 408 that is configured to receive user input to identify an endpoint device with which to initiate a claim process. For instance, a user may enter contact information into the claim field 408 to identify an endpoint device, such as a username, a phone number, a network address, and so forth.

A control panel 410 represents a control panel that is currently linked to a claimed endpoint and that is ready to receive input to cause the claimed endpoint to initiate a communication session with a contact. For instance, the control panel 410 includes a "Ready" status identifier and a controller ID "Controller_123" for the claimed endpoint.

The control panel 410 includes a call field 412 and a return video field 414. The call field 412 is configured to receive user input to identify a contact with which to initiate a communication session from the claimed endpoint device. For instance, a user may enter contact information into the call field 412 to identify a contact, such as a username, a phone number, a network address, and so forth. A user may also drag a contact icon from the contacts field 402 into the control panel 410 (e.g., into the call field 412) to cause a communication session to be automatically initiated between the claimed endpoint device and a contact to be called.

The return video field 414 represents a video feed from the claimed contact's endpoint device 102. For instance, when the claim process is performed, the return video field 414 is populated with a camera feed from a claimed endpoint device. If a call is initiated to a contact via the control panel 410, the return video field 414 represents call video that is presented to the called contact.

Further depicted in the call control region 404 is a control panel 416, which represents a control panel for an active communication session established according to techniques for device control for a communication session described herein. The control panel 416 identifies a called contact ("Hamish B.") and includes a visual representation 418 of the called contact. The visual representation 418, for instance, represents a live video feed from the called contact's endpoint device, such as real-time video captured at the endpoint device during the communication session. Alternatively, the visual representation 418 includes a still image representation of the called contact. For instance, when a live video feed satisfies a certain quality threshold, the live video feed is displayed as the visual representation 418. However, if the quality of the live video feed is degraded such that is fails to meet the quality threshold, a still image (e.g., a snapshot) of the called contact is displayed as the visual representation 418. Generally, the visual representation 418 represents visual content that is output from an endpoint device 102 as part of a media stream.

The control panel 416 further includes a call duration indicator 420, a call end control 422, and a return video field 424. The call duration indicator 420 indicates a current duration (age) of the communication session, and the call end control 422 is selectable to terminate the communication session. In at least some implementations, selecting the call end control 422 terminates the active communication session, but does not terminate a claim relationship between the controller client 122 and the claimed endpoint device. In such implementations, for example, a user may select the call end control 422 to end a current communication session, and may initiate another communication session from the claimed endpoint device without having to reclaim the endpoint device. Alternatively, selecting the call end control 422 terminates the communication session and also terminates a claim relationship between the controller client 122 and the claimed endpoint device.

The control panel 416 further includes a video attributes field 426, a network attributes field 428, and a system attributes field 430. The video attributes field 426 is populated with attribute and status information for an incoming video stream of the communication session, such as for the video feed displayed in the visual representation 418. Example information that can be populated to the video attributes field 426 includes video resolution, aspect ratio, actual frames per second (FPS) for the video, a target FPS for the video, and so forth.

The network attributes field 428 is populated with attribute and status information for a network connection (e.g., a single network or combination of multiple networks) over which the communication session is communicated. Example information that can be populated to the network attributes field 428 include a transport type (e.g., User Datagram Protocol (UDP), Transmission Control Protocol (TCP), and so forth), a transport quality status, network error indicators, and so forth.

The system attributes field 430 includes status and attributes of the claimed endpoint device that initiates the communication session on behalf of the controller client 122. Example information populated into the system attributes field 430 includes performance statistics for the endpoint device, such as total central processing unit (CPU) usage of the endpoint device, a percentage of CPU usage consumed by the communication session, data input/output bandwidth from the endpoint device, and so forth.

The call control region 404 further includes a control panel 432, which represents a control panel for another active communication session established according to techniques for device control for a communication session described herein. The communication session represented in the control panel 432, for example, is distinct from the communication session represented in the control panel 416.

The control panel 432 identifies a called contact ("Simon L.") and includes various visuals and controls for the communication session, such as a visual representation 434, a call duration indicator 436, a call end control 438, and a return video field 440. General attributes of these visuals and controls are detailed above, and they are populated based on information specific to the communication session linked to the control panel 432.

The control panel 432 further includes a snapshot control 442 which is user selectable to capture a snapshot 444. The snapshot 444, for instance, represents a still image captured from a frame of the video feed presented in the visual representation 434. For example, the snapshot 444 is a still image of the called contact. In at least some implementations, the snapshot 444 is populated to the visual representation 434 should a quality of the video feed for the communication session fall below a specified quality threshold.

Thus, the controller GUI 128 provides an integrated visual work environment that enables various tasks pertaining to device control for a communication session to be performed, and provides status information for various communication sessions.

While the example controller GUI 128 is depicted and discussed as having a particular visual and functional arrangement, it is to be appreciated that the controller GUI 128 may be visually and functionally arranged in a variety of different ways within the spirit and scope of the disclosed and claimed implementations. For instance, the various controls and fields illustrated in the different control panels are interchangeable among the control panels to provide for a variety of different call initiation and control scenarios.

Having discussed some example implementation scenarios, consider now a discussion of some example procedures in accordance with one or more embodiments.

Example Procedures

The following discussion describes some example procedures for device control for a communication session in accordance with one or more embodiments. The example procedures may be employed in the environment 100 of FIG. 1, the system 800 of FIG. 8, and/or any other suitable environment. The procedures, for instance, represent example procedures for performing the implementation scenarios described above. In at least some implementations, the steps described for the various procedures are implemented automatically and independent of user interaction. According to various implementations, the procedures may be performed locally (e.g., at the communication controller 116) and/or at a network-based service, such as the communication service 130.

Figure 5:
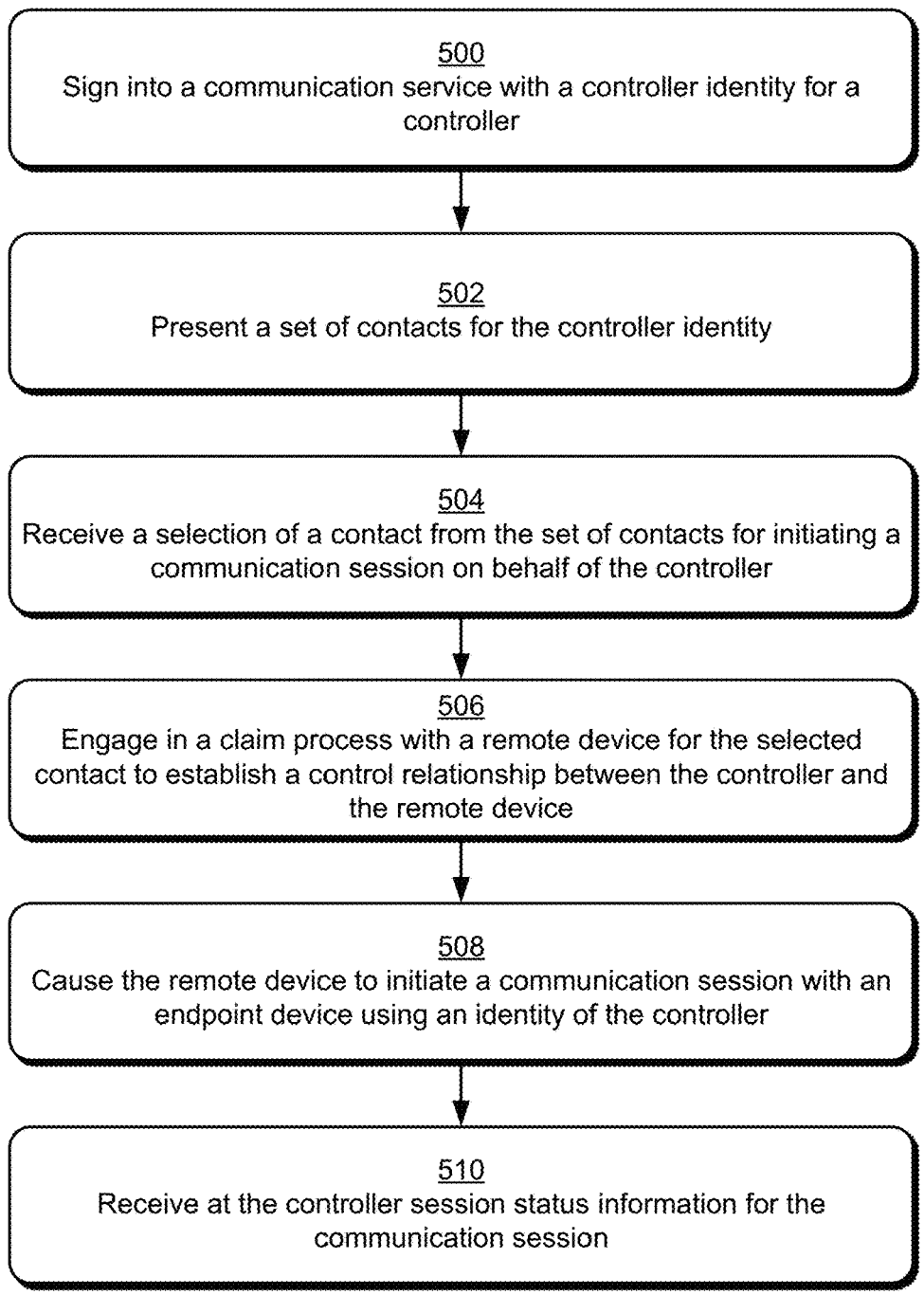
FIG. 5 is a flow diagram that describes steps in a method for initiating a remote communication session in accordance with one or more embodiments.

FIG. 5 is a flow diagram that describes steps in a method in accordance with one or more implementations. The method describes an example procedure for initiating a remote communication session in accordance with one or more implementations. In at least some implementations, the method may be performed at least in part at the communication controller 116 (e.g., by the controller client 122) and/or by the communication service 130. For instance, steps and actions performed as part of the method are initiated and controlled via user interaction with the controller GUI 128.

Step 500 signs into a communication service with a controller identity for a controller. The controller client 122, for instance, signs into (e.g., authenticates with) the communication service 130 using the controller ID 126.

Step 502 presents a set of contacts for the controller identity. A set of icons for different contacts, for instance, are displayed in the contacts field 402 of the controller GUI 128. Generally, the contacts represent identities in a contact list for the controller ID 126, such as retrieved from the client contacts module 124 and/or the communication service 130.

Step 504 receives a selection of a contact from the set of contacts for initiating a communication session on behalf of the controller. A user, for instance, selects a contact from the controller GUI 128. The controller client 122 detects the user selection, and initiates a remote call process with the selected contact.

Step 506 engages in a claim process with a remote device for the selected contact to establish a control relationship between the controller and the remote device. For example, the controller client 122 initiates and performs a claim process with a remote endpoint device 102. The claim process, for instance, causes the remote endpoint device to log out of a current account with the communication service 130, and to log in to the communication service 130 using the controller ID 126. According to various implementations, logging in via the controller ID 126 causes a contacts list for the controller ID 126 to be shared to the remote device such that the remote device can initiate a communication session with contacts of the contacts list using the controller ID 126.

Step 508 causes the remote device to initiate a communication session with an endpoint device using an identity of the controller. A user, for instance, interacts with the controller GUI 128 to select a contact with which to initiate the communication session. In response, the controller client 122 communicates a call instruction to the claimed device to initiate a communication session with an endpoint device associated with the selected contact. The claimed device then initiates the communication session and exchanges session media with the endpoint device as part of the communication session. Generally, the communication session is implemented via the communication service 130 and involves an exchange of session media between users and devices, such as voice media, video media, content, and so forth. Further, the instruction causes the claimed device to generate a media stream that includes media exchanged as part of the communication session, and to communicate the media stream to a consuming entity.

Figure 6:
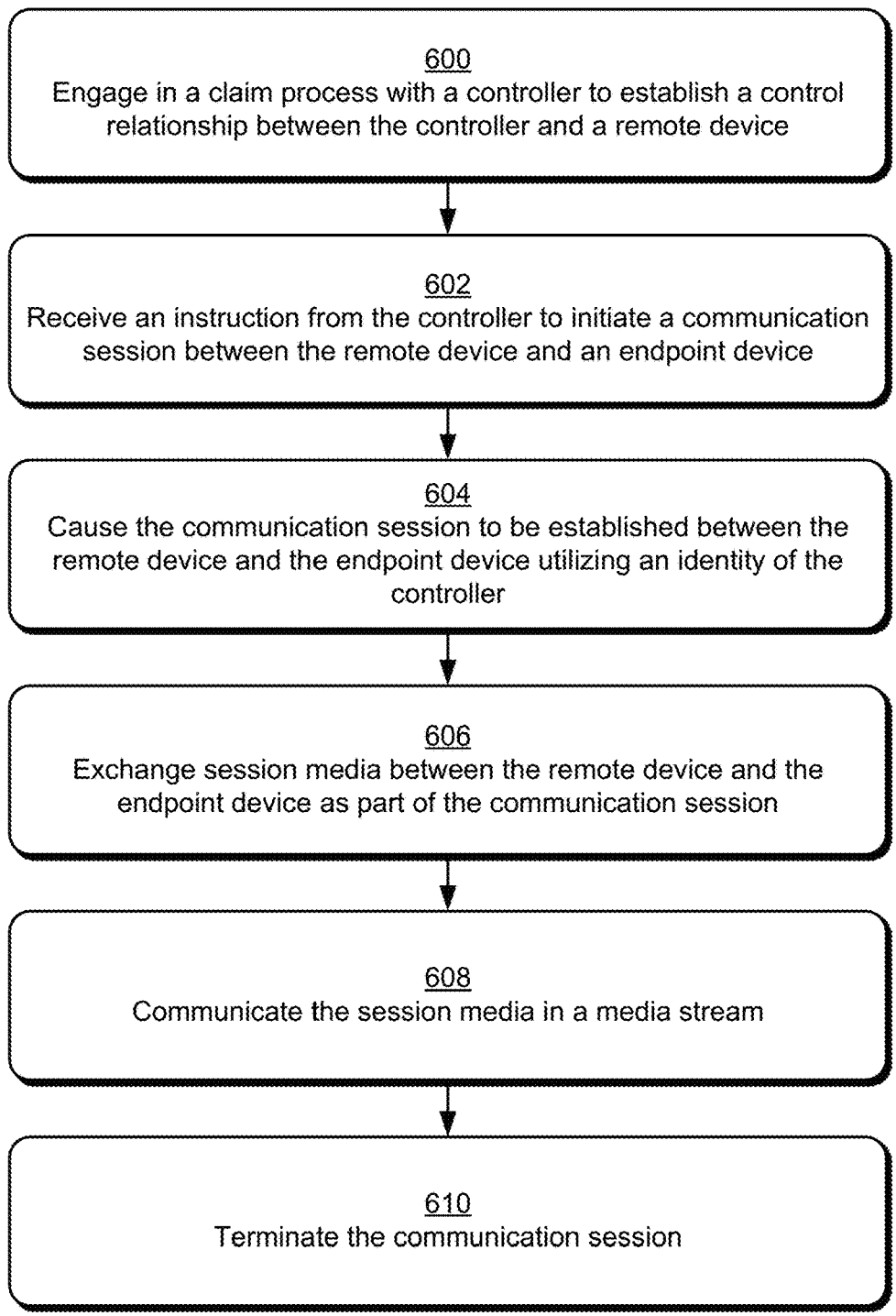
FIG. 6 is a flow diagram that describes steps in a method for initiating a communication session on behalf of a controller in accordance with one or more embodiments.

Step 510 receives at the controller session status information for the communication session. The session status information, for instance, is streamed to the communication controller 116 from the remote device and/or from the communication service 130. Generally, the session status information is received at the communication controller 116 separately (e.g., "out of band") from the communication session itself. Thus, the communication controller 116 is not an active participant in the communication session, but receives status information for the communication session. Ex FIG. 6 is a flow diagram that describes steps in a method in accordance with one or more implementations. The method describes an example procedure for initiating a communication session on behalf of a controller in accordance with one or more implementations. In at least some implementations, the method may be performed at least in part at an endpoint device 102 (e.g., by a communication client 106) and/or by the communication service 130.

Step 600 engages in a claim process with a controller to establish a control relationship between the controller and a remote device. A remote endpoint device 102, for instance, receives an instruction from the controller client 122 to log out from a current identity with the communication service 130, and to log back in to the communication service 130 with the controller ID 126. Thus, a control channel is established between the controller client 122 and the remote endpoint device 102. Further, a contacts list for the controller ID 126 is shared to the remote endpoint device 102.

Step 602 receives an instruction from the controller to initiate a communication session between the remote device and an endpoint device. The remote endpoint device 102, for example, receives contact information for a contact from the controller client 122 and an instruction to initiate a communication session with the contact. In at least some implementations, the instruction includes parameters for the communication session, such as media types to be exchanged during the communication session, technical parameters for signal flow during the communication session, and so forth.

In at least some implementations, the instruction includes an instruction to answer a pending call request. For instance, the remote device receives an indication from the controller client 122 that a different endpoint device 102 has communicated a call request to the controller client 122, and an instruction to answer the call request and engage in a communication session with the requesting device on behalf of the controller client 122.

Step 604 causes the communication session to be established between the remote device and the endpoint device utilizing an identity of the controller. For example, the remote endpoint device 102 communicates a call request to a different endpoint device 102, which accepts the call request. Alternatively, the remote endpoint device 102 answers a pending call request from a different endpoint device 102 on behalf of the controller client 122. Accordingly, the communication session is established via interaction with the communication service 130 and utilizing the controller ID 126.

Step 606 exchanges session media between the remote device and the endpoint device as part of the communication session. Generally, the communication session is managed by the communication service 130 and involves a real-time exchange of communication media between the endpoint devices, such as audio, video, and so forth. Further, since the calling device is authenticated with the communication service 130 via the controller ID 126, privacy settings and permissions for the controller ID 126 are applied for the communication session.

Step 608 communicates the session media in a media stream. The remote endpoint device, for instance, outputs a media stream that includes the session media. The endpoint device 102, for instance, outputs a media stream to a consuming entity that includes at least some of the session media. In at least some implementations, the endpoint device 102 processes the session media to transform the media into a form that is suitable for broadcast and/or recorded media content.

Step 610 terminates the communication session. The calling endpoint device 102, for instance, terminate the communication session. For example, the communication session is terminated in response to an instruction from the controller client 122 to terminate the session.

Figure 7:
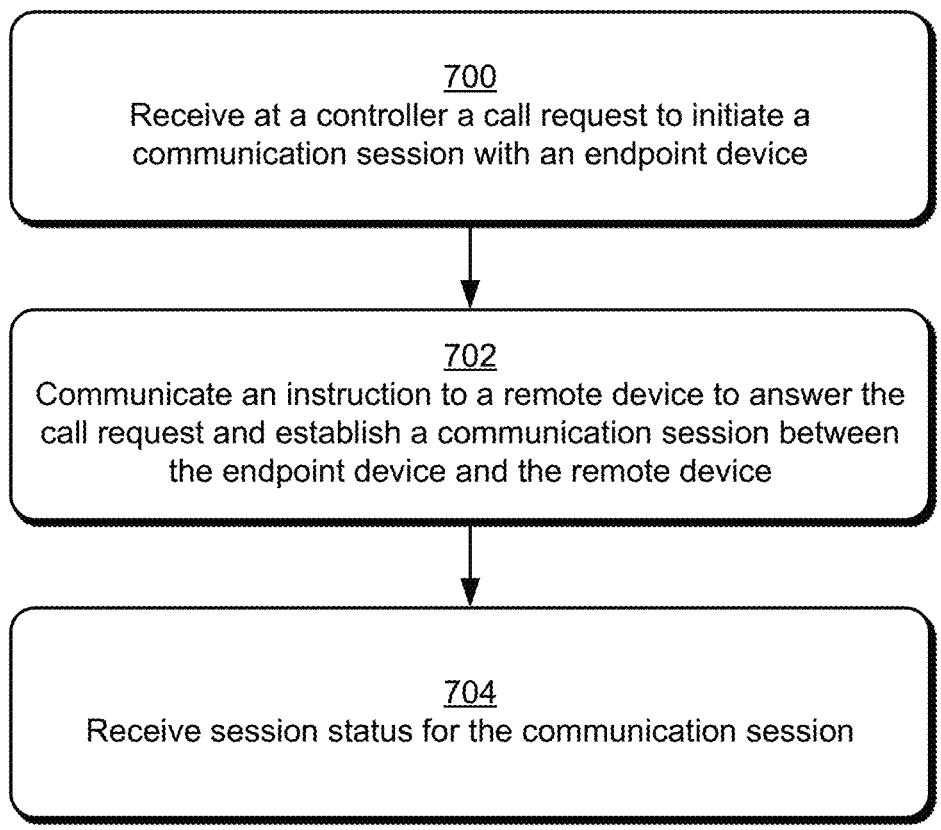
FIG. 7 is a flow diagram that describes steps in a method for initiating a remote call answer in accordance with one or more embodiments.

FIG. 7 is a flow diagram that describes steps in a method in accordance with one or more implementations. The method describes an example procedure for initiating a remote call answer in accordance with one or more implementations. In at least some implementations, the method may be performed at least in part at the communication controller 116 (e.g., by the controller client 122) and/or by the communication service 130. For instance, steps and actions performed as part of the method are initiated and controlled via user interaction with the controller GUI 128.

Step 700 receives at a controller a call request to initiate a communication session with an endpoint device. The controller client 122, for instance, receives a call request from a calling endpoint device 102. For example, the call request is addressed to the controller ID 126.

Step 702 communicates an instruction to a remote device to answer the call request and establish a communication session between the endpoint device and the remote device. For example, the controller client 122 identifies and selects an endpoint device from the client contacts module 124 that is available to answer the call, and communicates an instruction to the selected endpoint device to answer the call on behalf of the controller client 122. Further, the instruction causes the remote device to generate a media stream that includes media exchanged as part of the communication session, and to communicate the media stream to a consuming entity.

Thus, the selected endpoint device answers the call request and establishes a communication session with the calling device. The communication session, for instance, is implemented via interaction with the communication service 130.

In at least some implementations, the instruction to the remote device involves a claim process to establish a control channel between the controller client 122 and the selected endpoint device for purposes of accepting the call request on behalf of the controller client 122. Thus, the call request may be accepted by the remote device using the controller ID 126.

Step 704 receives session status for the communication session. The session status, for example, is received by the controller client 122 from one of the endpoint devices 102 involved in the communication session, and/or from the communication service 130. Generally, the controller client 122 may receive the session status without participating in the communication session itself. Examples of different session status information are discussed above.

Accordingly, techniques discussed herein provide a wide variety of scenarios and implementations for controlling endpoint devices to initiate and participate in communication sessions on behalf of a controller, and for generating media streams using media from the communication sessions.

Having discussed some example procedures, consider now a discussion of an example system and device in accordance with one or more embodiments.

Example System and Device

Figure 8:
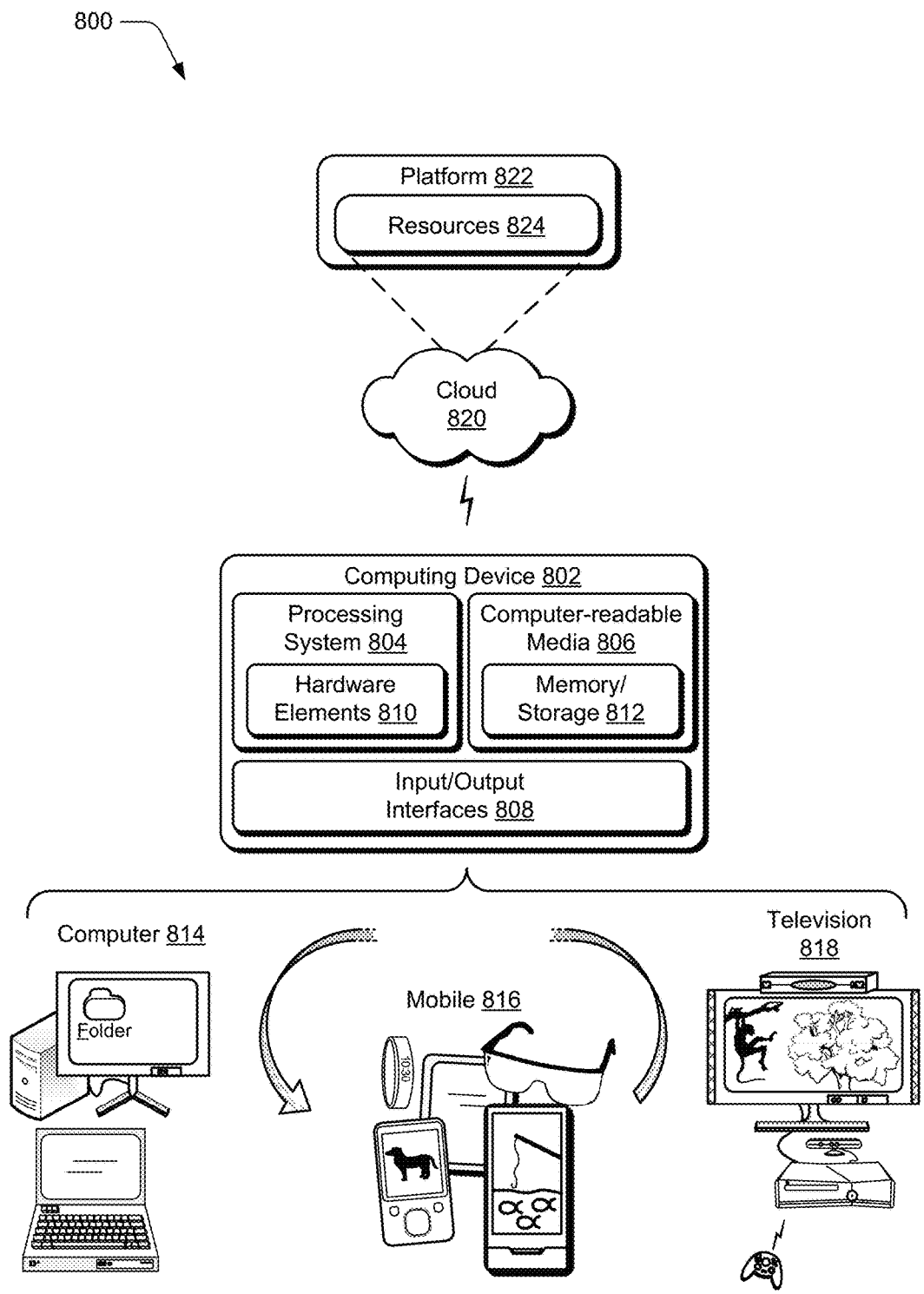
FIG. 8 illustrates an example system and computing device as described with reference to FIG. 1, which are configured to implement embodiments of techniques described herein.

FIG. 8 illustrates an example system generally at 800 that includes an example computing device 802 that is representative of one or more computing systems and/or devices that may implement various techniques described herein. For example, the endpoint devices 102, the communication controller 116, and/or the communication service 130 discussed above with reference to FIG. 1 can be embodied as the computing device 802. The computing device 802 may be, for example, a server of a service provider, a device associated with the client (e.g., a client device), an on-chip system, and/or any other suitable computing device or computing system.

The example computing device 802 as illustrated includes a processing system 804, one or more computer-readable media 806, and one or more Input/Output (I/O) Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules that are executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a wearable device, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. For example, functionalities discussed with reference to the controller client 122 and/or the communication service 130 may be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Implementations discussed herein include:

Example 1

A system for causing a media stream to be generated from a communication session, the system including: at least one processor; and one or more computer-readable storage media including instructions stored thereon that, responsive to execution by the at least one processor, cause the system perform operations including: engaging in a claim process with a remote device to establish a control relationship between a controller and the remote device; causing the remote device to initiate a communication session with an endpoint device using an identity of the controller, and to generate a media stream that includes media exchanged as part of the communication session; and receiving at the controller session status information for the communication session.

Example 2

A system as described in example 1, wherein the communication session is implemented at least in part via interaction with a communication service, and wherein said engaging in the claim process includes causing the remote device to authenticate with the communication service using the identity of the controller.

Example 3

A system as described in one or more of examples 1 or 2, wherein the communication session is implemented at least in part via interaction with a communication service, and wherein said engaging in the claim process includes: causing the remote device to log out from the communication service; and causing the remote device to authenticate with the communication service using the identity of the controller.

Example 4

A system as described in one or more of examples 1-3, wherein the operations further include causing a contacts list for the controller to be shared to the remote device responsive to said engaging in the claim process.

Example 5

A system as described in one or more of examples 1-4, wherein the operations further include presenting a controller graphical user interface (GUI) that includes visual representations of contacts for the identity of the controller, and wherein said engaging in the claim process is initiated responsive to a user selection of a visual representation of a contact associated with the remote device.

Example 6

A system as described in one or more of examples 1-5, wherein the operations further include presenting a controller graphical user interface (GUI) that includes visual representations of contacts for the identity of the controller, and wherein said causing the remote device to initiate the communication session is initiated responsive to a user selection of a visual representation of a contact associated with the endpoint device.

Example 7

A system as described in one or more of examples 1-6, wherein said causing the remote device to initiate the communication session includes communicating an instruction to the remote device to initiate the communication session with a contact associated with the endpoint device.

Example 8

A system as described in one or more of examples 1-7, wherein said receiving status information occurs in real-time while the communication session is in progress.

Example 9

A system as described in one or more of examples 1-8, wherein the controller is not a participant in the communication session.

Example 10

A system as described in one or more of examples 1-9, wherein the session media includes one or more of voice data, video data, or content data.

Example 11

A system as described in one or more of examples 1-10, wherein the controller is located remotely from the remote device and the endpoint device.

Example 12

A system as described in one or more of examples 1-11, wherein the session status information includes one or more of performance attributes for the communication session, performance attributes for a network involved in the communication session, or performance attributes of the remote device.

Example 13

A computer-implemented method for causing a media stream to be generated from a communication session, the method including: engaging in a claim process with a controller to establish a control relationship between the controller and a remote device; receiving an instruction from the controller to initiate a communication session between the remote device and an endpoint device; causing the communication session to be established between the remote device and the endpoint device utilizing an identity of the controller; exchanging session media between the remote device and the endpoint device as part of the communication session; and communicating at least some of the session media as a media stream to a device that is not a participant in the communication session.

Example 14

A method as described in example 13, wherein the communication session is implemented at least in part via interaction with a communication service, and wherein said engaging in the claim process causes the remote device to authenticate with the communication service using the identity of the controller.

Example 15

A method as described in one or more of examples 13 or 14, further including receiving a contacts list for the controller identity responsive to said engaging in the claim process.

Example 16

A method as described in one or more of examples 13-15, wherein said receiving the instruction from the controller to initiate the communication session includes an instruction to answer a call request from the endpoint device.

Example 17

A method as described in one or more of examples 13-16, wherein said communicating at least some of the session media as the media stream is performed separately from said exchanging the session media between the remote device and the endpoint device.

Example 18

A computer-implemented method for causing a media stream to be generated from a communication session, the method including: receiving at a controller a call request to initiate a communication session with an endpoint device; communicating an instruction to a remote device to answer the call request and establish a communication session between the endpoint device and the remote device, and to cause the remote device to generate a media stream with media exchanged as part of the communication session; and receiving session status information for the communication session.

Example 19

A method as described in example 18, wherein said communicating the instruction to the remote device to answer the call request includes instructing the remote device to accept the call request using an identity of the controller.

Example 20

A method as described in one or more of examples 18 or 19, wherein said communicating the instruction to the remote device to answer the call request occurs responsive to user input to a controller graphical user interface (GUI) selecting a contact associated with the remote device.

CONCLUSION

Techniques for device control for a communication session are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A system comprising:
   at least one hardware processor; and
   one or more computer-readable storage media including instructions stored thereon that, responsive to execution by the at least one hardware processor, cause the system perform operations including:
   engaging in a claim process with a remote device to establish a control relationship between a controller device and the remote device, the claim process authenticating the remote device with a communication service using an identity designated by the controller device;
   causing the remote device to initiate a communication session with another device using the designated identity; and
   receiving at the controller device session status information for the communication session, the session status information received at the controller device without the controller device being a participant in the communication session.

2. A system as recited in claim 1, wherein the instructions are configured to instruct the remote device to authenticate with the communication service using the designated identity.

3. A system as recited in claim 1, wherein the communication session is implemented at least in part via interaction with the communication service, and wherein the designated identity comprises an identity of the controller device with the communication service.

4. A system as recited in claim 1, wherein said engaging in the claim process comprises:
   causing the remote device to log out from the communication service; and
   causing the remote device to authenticate with the communication service using the designated identity.

5. A system as recited in claim 1, wherein the operations further include causing a contacts list for the designated identity to be shared to the remote device responsive to said engaging in the claim process.

6. A system as recited in claim 1, wherein the operations further include presenting a controller graphical user interface (GUI) that includes visual representations of contacts for the designated identity, and wherein said engaging in the claim process is initiated responsive to a user selection of a visual representation of a contact associated with the remote device.

7. A system as recited in claim 1, wherein the operations further include presenting a controller graphical user interface (GUI) that includes visual representations of contacts for the designated identity, and wherein said causing the remote device to initiate the communication session is initiated responsive to a user selection of a visual representation of a contact associated with the remote device.

8. A system as recited in claim 1, wherein the operations further include presenting a controller graphical user interface (GUI) at the controller device that includes live content from the communication session while the communication session is in progress and without the controller device being an authenticated participant in the communication session.

9. A system as recited in claim 1, wherein the operations further include presenting a controller graphical user interface (GUI) at the controller device that includes live content from the communication session and at least one other communication session while the communication session and the at least one other communication session are in progress and without the controller device being an authenticated participant in the communication session and the at least one other communication session.

10. A system as recited in claim 1, wherein said causing the remote device to initiate the communication session comprises communicating an instruction to the remote device to initiate the communication session with a contact associated with the remote device.

11. A system as recited in claim 1, wherein the session status information includes one or more of performance attributes for the communication session, performance attributes for a network involved in the communication session, or performance attributes of the remote device.

12. A computer-implemented method, comprising:
    engaging, by an endpoint device, in a claim process with a controller device to establish a control relationship between the controller device and the endpoint device, the claim process authenticating the endpoint device with a communication service using an identity designated by the controller device as part of the claim process;
    initiating, by the endpoint device, a communication session between the endpoint device and a different device using the designated identity; and
    providing, by the endpoint device, session status information for the communication session to the controller device without the controller device being a participant in the communication session.

13. A method as described in claim 12, wherein the communication session is implemented at least in part via interaction with a communication service, and wherein the instructions instruct the endpoint device to authenticate with the communication service using the designated identity.

14. A method as described in claim 12, further comprising receiving at the endpoint device a contacts list for the designated identity responsive to said engaging in the claim process.

15. A method as described in claim 12, wherein the instructions from the controller device instruct the endpoint device to initiate the communication session by answering a call request from the different device.

16. A method as described in claim 12, further comprising communicating at least some session media of the communication session to the controller device separately from said exchanging the session media between the endpoint device and the different device.

17. One or more computer-readable storage media storing instructions that when executed configure hardware processing circuitry to perform operations comprising:
    engaging, by a controller device, in a claim process with a remote device to establish a control relationship between the controller device and the remote device, the claim process authenticating the remote device with a communication service using an identity designated by the controller device and communicated to the remote device as part of the claim process;
    causing, by the controller device, the remote device to initiate a communication session with another device using the designated identity; and
    receiving, at the controller device, session status information for the communication session, the session status information received at the controller device without the controller device being a participant in the communication session.

18. The one or more computer-readable storage media as described in claim 17, the operations further comprising instructing, by the controller device, the remote device to authenticate with the communication service using the designated identity.

19. The one or more computer-readable storage media as described in claim 17, wherein the communication session is implemented at least in part via interaction with the communication service, and wherein the designated identity comprises an identity of the controller device with the communication service.

20. The one or more computer-readable storage media as described in claim 17, wherein the operations further include presenting a controller graphical user interface (GUI) at the controller device that includes live content from the communication session while the communication session is in progress and without the controller device being an authenticated participant in the communication session.

* * * * *